US009333693B2

(12) United States Patent
Yamauchi et al.

(10) Patent No.: US 9,333,693 B2
(45) Date of Patent: May 10, 2016

(54) METHOD FOR PRODUCING ALIPHATIC POLYESTER FILM (75) Inventors: Hideyuki Yamauchi, Otsu (JP); Junichi Masuda, Otsu (JP); Yoshikazu Endo, Otsu (JP); Osamu Kitamura, Otsu (JP)

(73) Assignee: Toray Industries, Inc. (JP)

( * ) Notice: Subject to any disclaimer, the term of this patent is extended or adjusted under 35 U.S.C. 154(b) by 707 days.

(21) Appl. No.: 13/253,169

(22) Filed: Oct. 5, 2011

(65) Prior Publication Data
US 2012/0086155 A1   Apr. 12, 2012

(30) Foreign Application Priority Data

Oct. 8, 2010 (JP) .................. 2010-228105

(51) Int. Cl.
*B29C 47/88*   (2006.01)
*B29C 47/92*   (2006.01)
*B29C 47/00*   (2006.01)
*B29C 47/14*   (2006.01)
*B29K 67/00*   (2006.01)

(52) U.S. Cl.
CPC ........... *B29C 47/888* (2013.01); *B29C 47/8865* (2013.01); *B29C 47/8875* (2013.01); *B29C 47/92* (2013.01); *B29C 47/0021* (2013.01); *B29C 47/14* (2013.01); *B29C 2947/92571* (2013.01); *B29C 2947/92923* (2013.01); *B29K 2067/043* (2013.01); *B29K 2067/046* (2013.01)

(58) Field of Classification Search
USPC ............... 264/211.12, 211.15, 464, 466, 141, 264/173.12, 177.17
See application file for complete search history.

(56) References Cited

U.S. PATENT DOCUMENTS

| 3,779,682 | A | * | 12/1973 | Huskey | ............... B29C 47/8875 226/94 |
| 2005/0287358 | A1 | * | 12/2005 | Inglis | ...................... B32B 27/36 428/328 |
| 2008/0147034 | A1 | * | 6/2008 | Wang et al. | .................... 604/370 |
| 2010/0213202 | A1 | * | 8/2010 | Tweed et al. | ................... 220/660 |

FOREIGN PATENT DOCUMENTS

| JP | 11-216759 | | 8/1999 |
| JP | 2000-108542 A | | 4/2000 |
| JP | 2000-202842 A | | 7/2000 |
| JP | 2000202843 | * | 7/2000 |
| JP | 2004-299099 A | | 10/2004 |
| JP | 2009-039890 A | | 2/2009 |
| JP | 2009-062410 A | | 3/2009 |

* cited by examiner

Primary Examiner — Stella Yi
(74) Attorney, Agent, or Firm — DLA Piper LLP (US)

(57) ABSTRACT

An aliphatic polyester film is obtained by melt-extruding an aliphatic polyester as a film, controlling the entrained air stream between a casting drum and the film while inhibiting the variations of the film edge portion landing points on the casting drum, and subsequently bringing the film into contact with the casting drum over the entire width of the film.

7 Claims, 4 Drawing Sheets

METHOD FOR PRODUCING ALIPHATIC POLYESTER FILM

RELATED APPLICATION

This application claims priority of Japanese Patent Application No. 2010-228105, filed Oct. 8, 2010, herein incorporated by reference.

TECHNICAL FIELD

This disclosure relates to a method for producing an aliphatic polyester film that is small in thickness irregularity, excellent in flatness, small in the differences of mechanical properties and optical properties between the machine direction and the transverse direction and, in addition, allows casting at higher speeds.

BACKGROUND

In recent years with rising environmental awareness, soil contamination problems caused by disposal of plastic products and the global warming problem caused by the increase of carbon dioxide owing to incineration attract attention. Research and development are energetically conducted on biodegradable resins as a control measure for the former and on resins made of the raw materials derived from plants incapable of giving additional loads of carbon dioxide into atmospheric air even with incineration as a control measure for the latter. Various biodegradable resins and resins made of the raw materials derived from plants are developed for shape holders used for exhibition packaging and the like of various commodities and for containers such as food trays and beverage cups. Above all, especially polylactic acid as an aliphatic polyester, which has a glass transition point of as high as approximately 60° C. and is transparent as a biodegradable plastic material derived from plants, attracts utmost attention as a promising material.

However, in the case where polylactic acid resin is melted and subsequently cooled and solidified on a casting drum, to obtain a cast film, a lactide is discharged together with the polylactic acid resin extruded from a die, and the lactide is deposited on the casting drum, to generate defective contact spots, raising the problem of film quality irregularity. Further, the electrostatic application method employed as a method for keeping the molten film in contact with the casting drum is effective when the production line speed is low, but if the production line speed is raised, air in the entrained air stream is caught in the contact interface between the extruded resin film and the casting drum surface, to disturb the contact of the film with the casting drum, raising the problem that the productivity cannot be enhanced.

As an means for solving the problem, proposed are a technique of specifying the casting drum temperature in the case where the molten polylactic acid resin is cooled and solidified on the casting drum, a technique of melt-extruding the polylactic acid resin as a film and cooling it via a water film on the casting drum, and a technique of bringing the resin film extruded through the slit clearance of a die into contact with the moving casting surface using two or more contact means different from each other.

For example, JP 2004-299099 A describes a method for producing a polylactic acid film at a high production efficiency by keeping the film temperature on the separation surface at the time of separation from the cooling drum at 25° C. to 45° C. to inhibit the oligomer deposition on the surface of the cooling drum used for forming a film of polylactic acid resin. However, in this production method, though the oligomer deposition generated from the polylactic acid resin on the casting drum can be inhibited at a relatively low casting speed, the oligomer contamination of the electrode used in the electrostatic application device cannot be inhibited in the course of long-term production. Further in a higher casting speed region, the pulsation of edge portions cannot be controlled and, in addition, since the casting drum temperature is high, it is difficult to separate the film. Accordingly the enhancement of productivity as achieved by enhancing the production speed cannot be observed.

JP 2000-108542 A describes a production method of melt-extruding polylactic acid resin as a film and cooling and casting the film via a water film on a casting drum. However, according to that production method, at the time of production in a low speed range, a defect-less film can be obtained while the oligomer deposition generated from the polylactic acid resin on the casting drum can be inhibited, but when the casting speed is in a high speed range, the pulsation at the edge portions cannot be controlled though the entrained air stream can be inhibited. Accordingly no enhancement of productivity can be observed.

JP 2009-39890 A discloses a method for producing a polyester sheet by applying spot air masses to the edge portions and further electrostatically bringing the edge portions into contact with a cooling drum when a wire electrode is used to bring the sheet into contact the cooling drum over the entire width.

JP 2000-202842 A discloses a film production method in which two or more contact means different from each other are applied. JP 2009-62410 A discloses a polylactic acid sheet production method, in which a sheet is brought into contact with a drum or the like while being controlled at a specific temperature.

It could therefore be helpful to provide a method for producing an aliphatic polyester film that is small in thickness irregularity, excellent in flatness, small in the differences of mechanical properties and optical properties between the machine direction and the transverse direction and, in addition, allows casting at higher speeds.

SUMMARY

We thus provide:

(I) A method for producing an aliphatic polyester film comprising the steps of melt-extruding an aliphatic polyester as a film, controlling the entrained air stream between a casting drum and the film while inhibiting the variations of the film edge portion landing points on the casting drum, and subsequently bringing the film into contact with the casting drum over the entire width of the film.

(II) A method for producing an aliphatic polyester film, according to (I), wherein the entrained air stream is controlled by at least one or more methods selected from (1) a method of forming a water film on the casting drum, (2) a method of sucking the air stream by a suction nozzle capable of generating a negative pressure region directly in contact with the film, installed at a position on the upstream side of the film landing site in the moving direction of the casting surface, and (3) a method of installing a shield plate with a length not shorter than the width of the die between the rear portion (in FIG. 3, the film landing point side in reference to the point reached vertically downward from the discharge hole of the die is called the front portion and the side opposite to the film landing point side is called the rear portion; hereinafter the same applies) of the die and the casting drum.

(III) A method for producing an aliphatic polyester film, according to (I), wherein the variations of the film edge portion landing points are inhibited by either a method of blowing spot air masses or an electrostatic application method of applying static charges.

(IV) A method for producing an aliphatic polyester film, according to (III), wherein a liquid film is further formed on the casting drum at the portions corresponding to the film edge portions.

(V) A method for producing an aliphatic polyester film, according to (I), wherein the film is brought into contact with the casting drum over the entire width of the film by either a method of using an air knife or an electrostatic application method of applying static charges.

(VI) A method for producing an aliphatic polyester film, according to (I), wherein the method for controlling the entrained air stream is the method of sucking the air stream by a suction nozzle capable of generating a negative pressure region directly in contact with the film, installed at a position on the upstream side of the film landing site in the moving direction of the casting surface; the method for inhibiting the variations of film edge portion landing points is the method of blowing spot air masses; and the method for bringing the film into contact with the casting drum over the entire width of the film is the method of using an air knife.

(VII) A method for producing an aliphatic polyester film, according to (I), wherein the aliphatic polyester is polylactic acid.

In the method for producing an aliphatic polyester film, entrained air stream between the casting drum and the film is controlled while the variations of the film edge portion landing points on the casting drum are inhibited, and subsequently the film is brought into contact with the casting drum over the entire width of the film, to ensure that a film small in thickness irregularity and quality irregularity can be obtained at a higher speed, hence at higher productivity, without allowing the film to adhere to the casting drum.

DETAILED DESCRIPTION

We intensively studied the abovementioned problem, i.e., a method for obtaining an aliphatic polyester film small in thickness irregularity and quality irregularity at a higher speed, hence at higher productivity. We discovered that the problem can be solved all at once by melt-extruding an aliphatic polyester as a film, controlling the entrained air stream between a casting drum and the film while inhibiting the variations of the film edge portion landing points on the casting drum, and subsequently bringing the film into contact with the casting drum over the entire width of the film.

Figure 1:
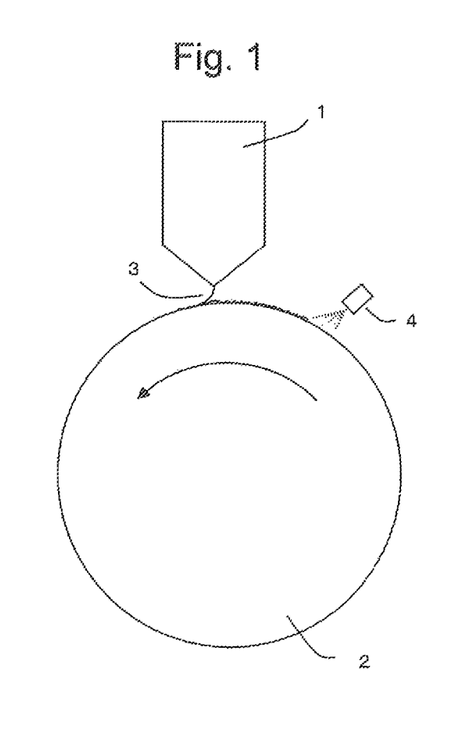
FIG. 1 is a schematic illustration showing a film forming apparatus employing a method of forming a water film.

As a means for controlling the entrained air stream, for example, it is preferred to form a water film on a casting drum (2). The method for forming a water film on the casting drum (2) can be a method of using a spray nozzle (4), a method of coating the drum with water oozing out of a porous roll, or a method of spraying humid air and the like. In this connection, it is preferred that the coating amount of the water film formed on the casting drum (2) is 0.05 to 20 g/m$^2$, since the releasability and the flatness of the obtained film become good. A more preferred range is 0.5 to 10 g/m$^2$. In this case, the water film is not required to be uniformly formed on the drum, and can also be discretely dispersed with the amount kept in the abovementioned range. Further, the water may also contain a surfactant or a solvent soluble in water. Furthermore, so that the water film can be formed uniformly on the casting drum (2), fine unevenness or cracking can also be formed on the surface. In this case, it is preferred that the surface roughness is in a range from 0.01 to 10 μm, since the casting drum film becomes well uniform. Moreover, if the temperature of the casting drum (2) is too high, the water film is likely to be evaporated and a uniform water film cannot be formed, or at the time of casting, boiling may occur to form surface defects. Therefore, it is preferred that the temperature is 50° C. or lower, and an especially preferred temperature range is 10 to 30° C.

Figure 2:
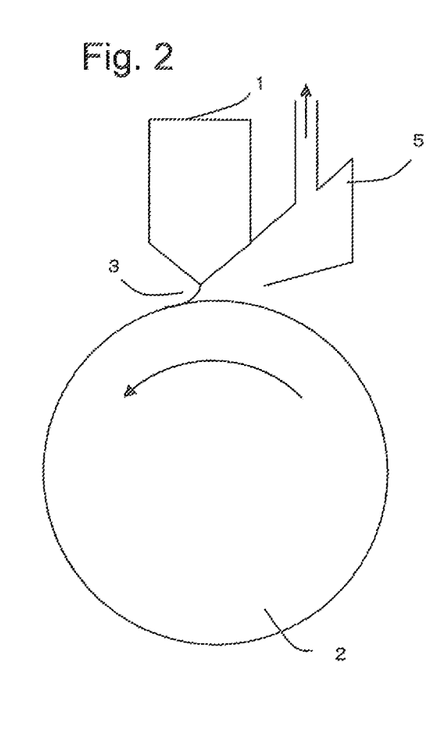
FIG. 2 is a schematic illustration showing a film forming apparatus employing a method of sucking an air stream.

As another means for controlling the entrained air stream, for example, preferred is a method of sucking the air stream by a suction nozzle (5) capable of generating a negative pressure region directly in contact with the film, installed at a position on the upstream side of the film landing site in the moving direction of the casting surface. In this case, it is preferred that the width of the suction nozzle (5) is in a range from the width equal to the die width to 100 mm each from the respective ends to control the entrained air stream affecting the film as a whole. Further, the clearance between the lowest portion of the suction nozzle (5) and the casting drum (2) is 5 mm to not larger than the die lip position height to minimize the influence of the entrained air stream. It is preferred to attach a suction blower or the like to the suction nozzle (5) for generating the negative pressure region.

Figure 3:
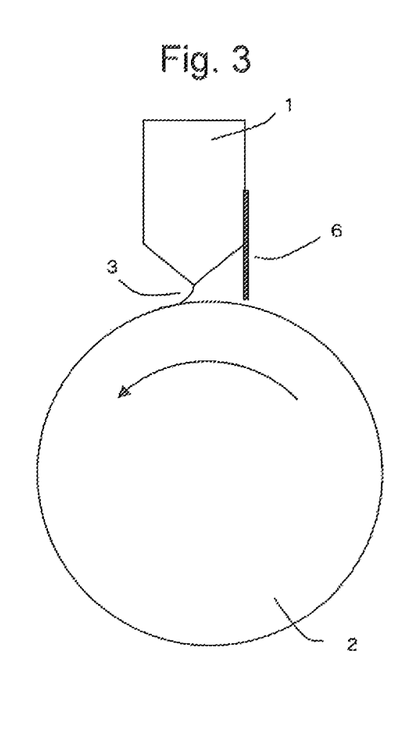
FIG. 3 is a schematic illustration showing a film forming apparatus employing a method of installing a shield plate.

As a further other means for controlling the entrained air stream, it is preferred to install a shield plate (6) not shorter than the width of the die (1) between the rear portion of the die (1) and the casting drum (2) to control the entrained air stream affecting the film as a whole. Further, it is preferred that the width of the shield plate (6) installed is in a range from the width equal to the die width to 100 mm each from the respective ends. It is preferred that the clearance between the rear portion of the die (1) and the shield plate (6) is 0 to 10 mm and that the distance between the shield plate (6) and the casting drum (2) is 10 mm to 0.1 mm to minimize the influence of the entrained air stream.

Figure 4:
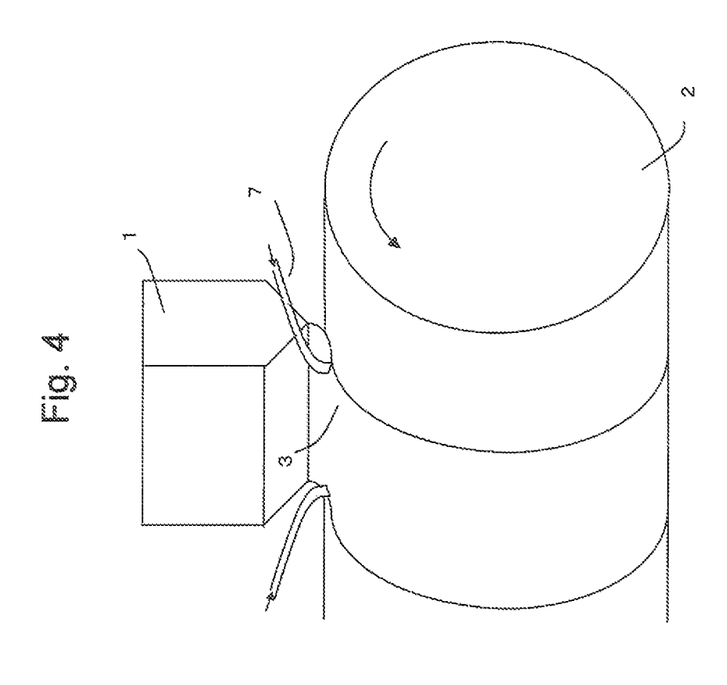
FIG. 4 is a schematic illustration showing a film forming apparatus employing a method of blowing spot air masses.

As a means for inhibiting the variations of the film edge portion landing points, it is preferred to blow spot air masses (7). It is preferred that the positions of the spot air masses (7) are positions of 5 to 20 mm toward the film center from the extreme edge portions of the film, to inhibit the variations of the film edge portion landing points and not to affect the film center. Further, it is preferred that the distances between the spot air masses (7) and the film are 5 to 30 mm, to inhibit the variations of the film edge portion landing points and not to affect the film center. In this case, it is preferred that the spot air masses (7) are shaped like pipes with a diameter of 5 to 20 mm in view of the stability of air blow intensity. Though the tip forms of the air masses are not especially specified, it is preferred in view of preventing the edge portions from being deformed that the tip forms are circles, ellipses or rectangles. Furthermore, it is preferred that the pressure of the spot air masses (7) is 0.05 to 0.3 kg/cm² in view of the contact of the film edge portions with the casting drum (2).

Figure 5:
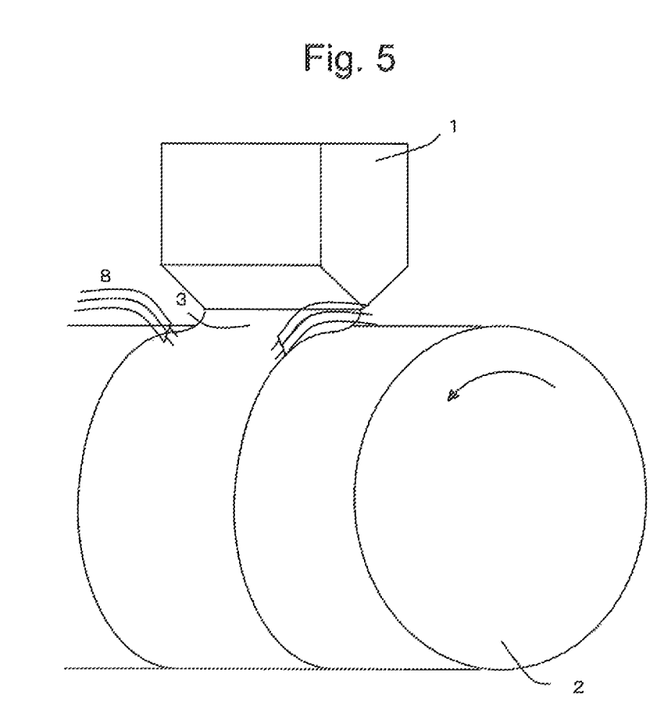
FIG. 5 is a schematic illustration showing a film forming apparatus employing an electrostatic application method.

As another means for inhibiting the variations of the edge landing points, preferred is an electrostatic application means for applying static charges using electrodes (8). In this case, it is preferred that the positions of the electrodes (8) are the positions of 5 to 20 mm toward the film center from the extreme edge portions of the film to inhibit the variations of the edge landing points and not to affect the film center. The shape of each of the needle-like electrodes is not especially specified, but an electrode in which a needle-like tungsten tip with a diameter of 1 to 2 mm having a sharpened point is embedded in an aluminum support with a diameter of 3 to 5 mm is preferred. It is preferred that the portion other than 2 to 5 mm from the tip portion is insulated with a PTFE tube. Further, one needle-like electrode can be used but two or more needle-like electrodes can also be used preferably in combination. In this case, it is preferred in view of the contact of the film edge portions with the casting drum (2) that the applied voltage of the static charges is 5 to 10 kV.

Figure 6:
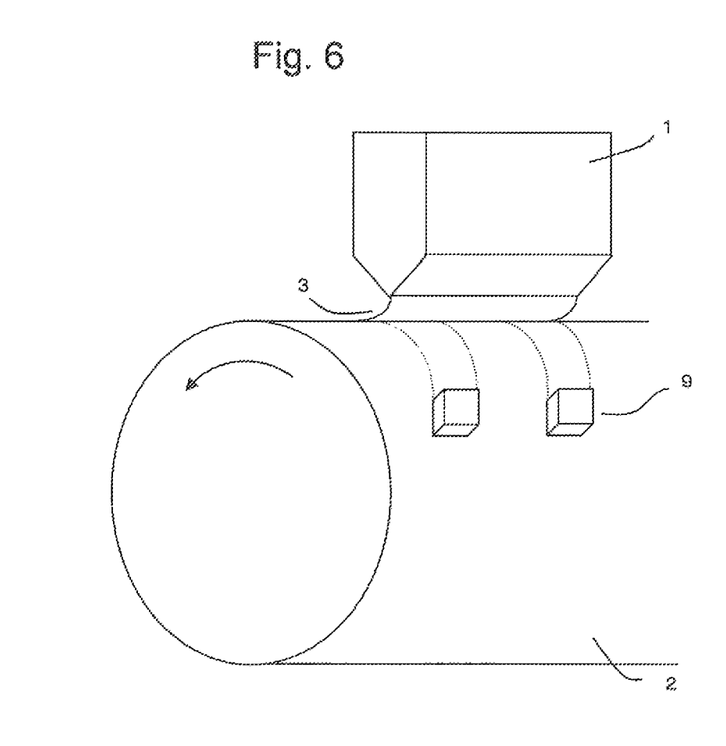
FIG. 6 is a schematic illustration showing a film forming apparatus employing a method of forming a liquid film at the portions corresponding to the film edge portions.

With regard to the abovementioned means for inhibiting the variations of the edge landing points, a method of forming a liquid film on the casting drum (2) at the portions corresponding to the edge portions is more preferred for inhibiting the variations. It is preferred that the liquid film is liquid paraffin. As for the method for coating liquid paraffin, a method of pressing felt pieces (9) impregnated with liquid paraffin to the edge portions on the casting drum (2) for coating is preferred.

Figure 7:
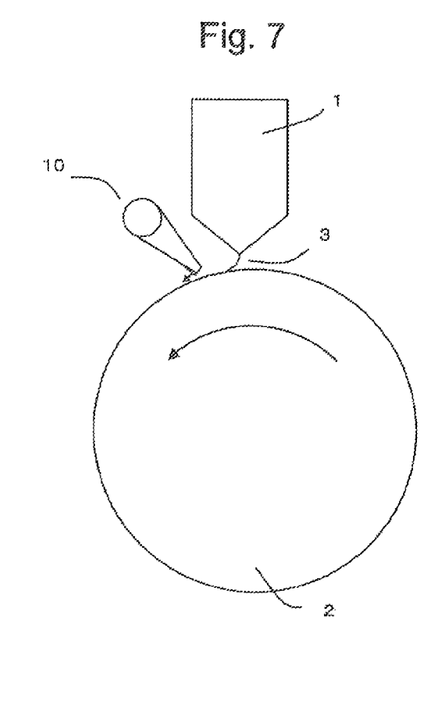
FIG. 7 is a schematic illustration showing a film forming apparatus employing a method of using an air knife.

As a means for bringing the film into contact with the casting drum over the entire width of the film, using an air knife (10) is preferred. In this case, it is preferred that the slit length of the air discharge portion for the air knife is in a range of (the width of the film extruded from the die −30 to +50 mm) to bring the film into contact with the casting drum (2) over the entire width of the film. Further, it is preferred in view of the balance of discharged air in the width direction that the air discharge slit width is 0.1 to 2 mm. A more preferred range is 0.5 to 1.0 mm. Furthermore, it is preferred in view of the contact of the film with the casting drum (2) that the air blowing direction of the air knife (10) is at an angle of 90 to 15° with respect to the casting drum, and it is preferred in view of the contact of the film with the casting drum (2) that the distance from the film is 5 to 30 mm. Moreover, it is preferred in view of the contact of the film with the casting drum (2) that the pressure of the air knife is 0.05 to 0.3 kg/cm².

Figure 8:
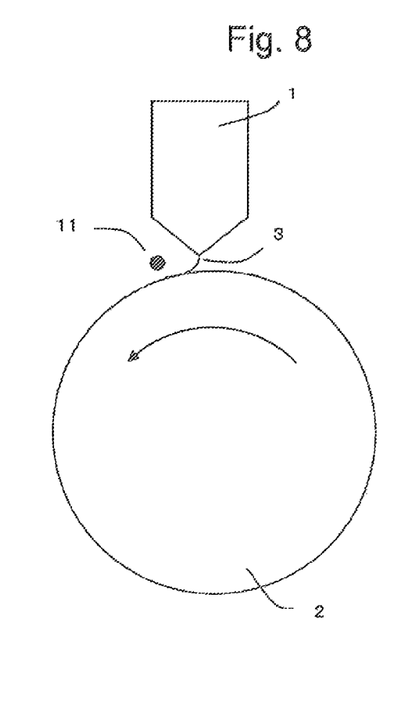
FIG. 8 is a schematic illustration showing a film forming apparatus employing an electrostatic application method.

As another means for bringing the film into contact with the casting drum over the entire width of the film, preferred is an electrostatic application means for applying static charges by an electrode (11) (wire-like electrode). In this case, as the wire-like electrode, a tungsten wire with a diameter of 0.1 to 0.2 mm is preferred in view of easy application of static charges to the film. It is preferred in view of the contact of the film with the casting drum that the distance from the film is 5 to 30 mm. Further, it is preferred in view of the contact of the film with the casting drum (2) that the applied voltage of static charges is 5 to 10 kV, and it is preferred to apply the voltage using a DC voltage-stabilized power supply and the like.

Figure 9:
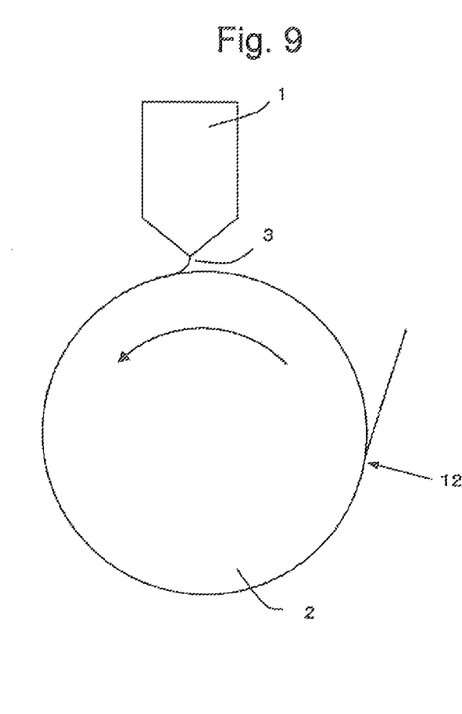
FIG. 9 is a view showing the point of separation from the casting drum.

When the film brought into contact with the casting drum over the entire width of the film and subsequently cooled by the aforementioned production method is separated from the casting drum (2), the temperature at the separation point (12) must be lower than the glass transition temperature of the aliphatic polyester. It is not preferred that the temperature of the separation point (12) is higher than the glass transition point of the aliphatic polyester, since the film adheres to the casting drum, to lower productivity.

The aliphatic polyester film production method can be more preferably established by combining a method of controlling the entrained air stream between the casting drum and the film, a method of inhibiting the variations of the film edge portion landing points on the casting drum and a method of bringing the film into contact with the casting drum over the entire width of the film. The most effective combination is to employ the method of sucking the air stream by a suction nozzle capable of generating a negative pressure region directly in contact with the film, installed on the upstream side of the film landing site in the moving direction of the casting surface as the method for controlling the entrained air stream, the method of blowing spot air masses as the method for inhibiting the variations of the film edge portion landing points, and the method of using an air knife as the method for bringing the film into contact with the casting drum over the entire width of the film.

The reasons why the abovementioned combination is preferred are as follows. For the control of the entrained air stream, a suction nozzle is preferred in view of the cost of equipment, the operation convenience of position adjustment during film formation and the like. Further, with regard to the combination of spot air masses and an air knife, the contact method by spot air masses and an air knife usually employed for the casting method of polypropylene with a high melt viscosity is especially preferred for an aliphatic polyester such as polylactic acid, since the melt viscosity of the aliphatic polyester is higher than the mean value of the melt viscosity of an aromatic polyester such as polyethylene terephthalate and the melt viscosity of a polyolefin such as polypropylene. In the conventional practice, an electrostatic application method of applying static charges by a wire-like electrode over the entire width of a film is known for the casting method of an aromatic polyester such as polyethylene terephthalate, since the aromatic polyester is lower in melt resistivity than a polyolefin such as polypropylene and a polyamide such as nylon.

It is preferred that the cast aliphatic polyester film obtained as described above is in succession stretched monoaxially or biaxially. Any stretching method can be used, and such methods as a monoaxial longitudinal stretching method using a roll-type stretching machine, monoaxial lateral stretching method using a stenter, simultaneous biaxial stretching method using inflation, simultaneous biaxial stretching method using a stenter and sequential biaxial stretching method using stenters can be used.

The aliphatic polyester is a polycondensation product obtained from an aliphatic dicarboxylic acid and an aliphatic diol, a polycondensation product of an aliphatic hydroxycarboxylic acid or the like, but is not especially limited in the structure of monomers or polymerization method and the like.

Examples of the aliphatic polyesters include polybutylene sebacate, polybutylene succinate, polybutylene succinate/adipate, polypropylene sebacate, polypropylene succinate, polypropylene succinate/adipate, polylactic acid, polyglycolic acid and the like. Among them, in view of the environmental aspect of using the raw materials derived from plants and in view of performance such as excellent transparency and heat resistance, polylactic acid with L-lactic acid and/or D-lactic acid units as the main component is preferred as the aliphatic polyester.

L-lactic acid and/or D-lactic acid units as the main component means that 70 mol % to 100 mol % of L-lactic acid and/or D-lactic acid units are contained based on the total amount of the aliphatic polyester.

In this description, the term, an aliphatic polyester is used as a synonym to an aliphatic polyester resin to be molded into a film, and the aliphatic polyester resin may contain additives, for example, thermal stabilizer, ultraviolet light absorber, weather stabilizer, organic or inorganic lubricant, pigment, dye, filler, antistatic agent, nucleating agent and the like, to such an extent that the desired effects are not impaired.

As the poly-L-lactic acid, it is preferred that the content of L-lactic acid units in the polylactic acid polymer is more than 50 mol % to 100 mol % and, in view of crystallinity, it is preferred that the content of L-lactic acid units is 80 mol % to 100 mol %. A more preferred range is 95 mol % to 100 mol %, and a further more preferred range is 98 mol % to 100 mol %.

On the other hand, as the poly-D-lactic acid, it is preferred that the content of D-lactic acid units in the polylactic acid polymer is more than 50 mol % to 100 mol % and, in view of crystallinity, it is preferred that the content of D-lactic acid units is 80 mol % to 100 mol %. A more preferred range is 95 mol % to 100 mol %, and a further more preferred range is 98 mol % to 100 mol %.

The crystallinity of the poly-L-lactic acid resin per se changes depending on the content of D-lactic acid units in the poly-L-lactic acid. That is, if the content of D-lactic acid units in the poly-L-lactic acid is larger, the poly-L-lactic acid becomes lower in crystallinity and more amorphous. On the contrary, if the content of D-lactic acid units in the poly-L-lactic acid is smaller, the poly-L-lactic acid becomes higher in crystallinity. Likewise the crystallinity of poly-D-lactic acid resin per se changes depending on the content of L-lactic acid units in the poly D-lactic acid. That is, if the content of L-lactic acid units in the poly-D-lactic acid becomes larger, the poly-D-lactic acid becomes lower in crystallinity and more amorphous and, on the contrary, if the content of L-lactic acid units in the poly-D-lactic acid is smaller, the poly-D-lactic acid becomes higher in crystallinity.

The polylactic acid used as the aliphatic polyester may also contain other monomer units than lactic acid. As examples of the other monomer, glycol compounds such as ethylene glycol, propylene glycol, butanediol, heptanediol, hexanediol, octanediol, nonanediol, decanediol, 1,4-cyclohexanedimethanol, neopentyl glycol, glycerol, pentaerythritol, bisphenol A, polyethylene glycol, polypropylene glycol and polytetramethylene glycol, dicarboxylic acids such as oxalic acid, adipic acid, sebacic acid, azelaic acid, dodecanedioic acid, malonic acid, glutaric acid, cyclohexanedicarboxylic acid, terephthalic acid, isophthalic acid, naphthalene-dicarboxylic acid, bis(p-carboxyphenyl)methane, anthracenedicarboxylic acid, 4,4'-diphenyl-etherdicarboxylic acid, 5-sodiumsulfoisophthalic acid and 5-tetrabutylphosphoniumisophthalic acid, hydroxycarboxylic acids such as glycolic acid, hydroxypropionic acid, hydroxybutyric acid, hydroxyvaleric acid, hydroxycaproic acid and hydroxybenzoic acid, and lactones such as caprolactone, valerolactone, propiolactone, undecalactone and 1,5-oxsepane-2-one can be enumerated. In the case where the aliphatic polyester is a polylactic acid-based resin, it is preferred that the copolymerized amount of the abovementioned other monomer units is 0 to 30 mol % based on the amount of all the monomer units of the polylactic acid-based resin. A more preferred range is 0 to 10 mol %.

It is preferred that the mass average molecular weight of the polylactic acid used as the aliphatic polyester is 50,000 to 500,000 to satisfy adequate film formability, stretchability and practical mechanical properties. A more preferred range is 100,000 to 250,000. The mass average molecular weight in this description is the molecular weight obtained by measuring by gel permeation chromatography (GPC) using chloroform as a solvent and calculating in terms of polymethyl methacrylate.

Property Measuring Methods and Effect Evaluating Methods

The property measuring methods and effect evaluating methods are as follows.

(1) Glass Transition Point (Tg)

Five milligrams of a film sample was heated using a differential scanning calorimeter, RD220 produced by Seiko Denshi K.K., at a heating rate of 20 m/min from room temperature up to 280° C., held at 280° C. for 5 minutes, then quickly cooled by liquid nitrogen, and heated again at a heating rate of 20° C./min from room temperature, to obtain the glass transition point.

(2) Amount of a Water Film Formed on a Casting Drum ($g/m^2$)

A casting drum was rotated at a predetermined line speed, to form a water film, and a mass roll with an effective width of 100 mm and a diameter of 50 mm (produced by Masuda Seisakusho K.K.) was used to set the wipe-off time as appropriate for achieving a measurement area of 10 to 100 $m^2$, the formed water film being perfectly wiped off. Then, the mass (W2 [g]) of the mass roll was measured, and the amount of the water film was obtained from the following formula using the initial mass (W1 [g]) and the measurement area (S [$m^2$]). Meanwhile, the mass roll had been held in the measurement atmosphere for 6 hours or more, to be humidity-conditioned.

$$\text{Amount of water film } (g/m^2) = (W2 - W1)/S$$

(3) Defective Contact Spots Between the Film and the Casting Drum

The contact state of the film on the casting drum was visually observed in the range from the portion brought into contact with the casting drum by a contact device to the portion separated from the casting drum.

Good contact: No air was caught between the film and the casting drum, and neither width variation nor meandering of the film was observed.

Poor contact: Air was caught between the film and the casting drum, or the width variation or meandering of the film was observed.

(4) Highest Casting Speed

The casting speed was raised at 5 m/min intervals, to observe the film, and the highest speed at which no defective contact spots occurred was obtained.

The film that allowed the speed to be raised to 50 m/min or higher was found to have the intended effect.

Our methods are explained below on the basis of Examples and Comparative Examples, but are not limited thereto or thereby.

EXAMPLES 1 to 16

A raw material obtained by adding 1 mass % of alumina silicate particles (SILTON JC20 (average particle size 2 μm)) produced by Mizusawa Industrial Chemicals, Ltd. to L-poly-lactic acid (melting point 175° C.) with a mass average molecular weight of 100,000 was dried in vacuum at 100° C.

for 3 hours, subsequently plasticized by an extruder of 90 mm diameter heated to 220° C., and extruded as a film from a drawing pen die of 270 mm, and the extruded film was brought into contact with a rotating casting drum with a diameter of 600 mm set at 20° C. by controlling the entrained air stream, inhibiting the variations of film portion edge landing points and bringing the film into contact with the casting drum over the entire width of the film by the methods shown in Table 1. The casting speed was raised to examine the casting speeds till defective contact spots were generated on the film. The casting speed was raised at 5 m/min intervals, to observe the film, and the highest speed at which no defective contact spots were generated was identified. Even when the casting speed was changed, the film thickness was kept at 200 μm by adjusting the discharged amount.

1. Method for Controlling the Entrained Air Stream
   (1) Water film coating method: One spray nozzle capable of spraying water as mist was installed at a place of 50 mm apart from the casting drum as shown in FIG. 1, for coating.
   (2) Air stream suction method: A nozzle longer than the die width by 20 mm each from both the ends and designed to allow suction by a suction blower was installed on the upstream side in the moving direction of the casting surface as shown in FIG. 2, for sucking the air stream.
   (3) Shield plate method: A 3 mm thick aluminum shield plate longer than the die width by 20 mm each from both the ends was installed at the rear portion of the die, to form a clearance of 5 mm from the casting drum as shown in FIG. 3.
2. Film Edge Portion Landing Point Control Method
   (1) Spot air mass method: L-shaped steel pipes with a diameter of 5 mm were installed at both the edge portions of the film (at positions of 10 mm toward the film center from the extreme edge portions) (at a distance of 10 mm from the film) as shown in FIG. 4, and air was blown for control from the tips of the pipes.
   (2) Electrostatic application method: Three electrodes, in each of which a needle-like tungsten tip with a diameter of 1.5 mm having a sharpened point was embedded in an aluminum support with a diameter of 3, were set respectively at both the edge portions of the film (at positions of 10 mm toward the film center from the extreme edge portions) (the portion other than 3 mm from the tip portion was insulated with a PTFE tube with an outer diameter of 4 mm) as shown in FIG. 5 (at a distance of 10 mm from the film), and static charges were applied by a DC voltage-stabilized power supply (produced by K.K. Haiden Kenkyusho).
   (3) Liquid film coating: The casting drum was coated with liquid paraffin at the rear of the die using felt pieces (50 mm×50 mm×30 mm thick) impregnated with liquid paraffin while the abovementioned control of the film edge portion landing points was performed (FIG. 6).
3. Entire Film Width Contact Method
   (1) Air knife method: An air knife with a slit clearance of 270 mm wide×0.5 mm having a blower attached thereto was used at a distance of 10 to 20 mm from the film with the air blow direction kept at an angle of 45° with respect to the casting drum (the distance and angle were finely adjusted while the contact state of the film was observed) for blowing the film landing site on the casting drum as shown in FIG. 7, to bring the film into contact with the casting drum over the entire width of the film.
   (2) Electrostatic application method: A tungsten wire with a diameter of 0.1 mm (the portions beyond the film width were insulated with a PTFE tube) was installed at a distance of 10 mm from the film, to apply static charges to the film landing site on the casting drum as shown in FIG. 8, by a DC voltage-stabilized power supply (produced by K.K. Haiden Kenkyusho).

COMPARATIVE EXAMPLES 1 to 10

The casting speed was changed to confirm the highest casting speed at which no defective contact spots were generated on each film as described in Examples, except that one or two methods only were carried out for controlling the entrained air stream, inhibiting the variations of edge portion landing points or bringing the film into contact with the casting drum over the entire width of the film in Comparative Examples. In any of Comparative Examples, the speed could not be raised.

TABLE 1

| | Entrained air steam control method | | | | Film edge portion landing point control method | | | | Liquid |
|---|---|---|---|---|---|---|---|---|---|
| | Water film coating | Water film thickness (g/m²) | Suction nozzle | Shield plate | Spot air masses | Air pressure (kg/cm²) | Electrostatic application | Applied voltage (kV) | film coating (liquid paraffin) |
| Example 1 | ○ | 2 | | | ○ | 0.2 | | | |
| Example 2 | ○ | 2 | | | ○ | 0.2 | | | ○ |
| Example 3 | ○ | 2 | | | ○ | 0.2 | | | |
| Example 4 | ○ | 2 | | | | | ○ | 8 | |
| Example 5 | | | ○ | | ○ | 0.2 | | | |
| Example 6 | | | ○ | | ○ | 0.2 | | | |
| Example 7 | | | ○ | | ○ | 0.2 | | | |
| Example 8 | | | ○ | | ○ | 0.1 | | | |
| Example 9 | | | ○ | | ○ | 0.3 | | | |
| Example 10 | | | ○ | | ○ | 0.2 | | | ○ |
| Example 11 | | | ○ | | ○ | 0.2 | | | |
| Example 12 | | | ○ | | | | ○ | 8 | |
| Example 13 | | | | ○ | ○ | 0.2 | | | |
| Example 14 | | | | ○ | ○ | 0.2 | | | ○ |
| Example 15 | | | | ○ | ○ | 0.2 | | | |
| Example 16 | | | | ○ | | | ○ | 8 | |
| Comparative Example 1 | ○ | 2 | | | | | | | |

TABLE 1-continued

| | | | | | | |
|---|---|---|---|---|---|---|
| Comparative Example 2 | ○ | 2 | | | | |
| Comparative Example 3 | | | ○ | | | |
| Comparative Example 4 | | | ○ | | | |
| Comparative Example 5 | | | | ○ | | |
| Comparative Example 6 | | | | ○ | | |
| Comparative Example 7 | | | | | ○ | 0.2 |
| Comparative Example 8 | | | | | ○ | 0.2 |
| Comparative Example 9 | | | | | | |
| Comparative Example 10 | | | | | | |

| | Entire sheet width contact method | | | | Highest casting speed m/min |
|---|---|---|---|---|---|
| | Air knife | Air pressure (kg/cm²) | Electrostatic application | Applied voltage (kV) | |
| Example 1 | ○ | 0.2 | | | 80 |
| Example 2 | ○ | 0.2 | | | 100 |
| Example 3 | | | ○ | 8 | 70 |
| Example 4 | ○ | 0.2 | | | 80 |
| Example 5 | ○ | 0.2 | | | 100 |
| Example 6 | ○ | 0.1 | | | 90 |
| Example 7 | ○ | 0.3 | | | 100 |
| Example 8 | ○ | 0.2 | | | 95 |
| Example 9 | ○ | 0.2 | | | 100 |
| Example 10 | ○ | 0.2 | | | 100 |
| Example 11 | | | ○ | 8 | 60 |
| Example 12 | ○ | 0.2 | | | 80 |
| Example 13 | ○ | 0.2 | | | 70 |
| Example 14 | ○ | 0.2 | | | 80 |
| Example 15 | | | ○ | 8 | 70 |
| Example 16 | ○ | 0.2 | | | 70 |
| Comparative Example 1 | ○ | 0.2 | | | 30 |
| Comparative Example 2 | | | ○ | 8 | 35 |
| Comparative Example 3 | ○ | 0.2 | | | 30 |
| Comparative Example 4 | | | ○ | 8 | 30 |
| Comparative Example 5 | ○ | 0.2 | | | 25 |
| Comparative Example 6 | | | ○ | 8 | 25 |
| Comparative Example 7 | ○ | 0.2 | | | 40 |
| Comparative Example 8 | | | ○ | 8 | 35 |
| Comparative Example 9 | ○ | 0.2 | | | 15 |
| Comparative Example 10 | | | ○ | 8 | 20 |

If the aliphatic polyester production method is used, casting and stretching can be performed at higher speeds and, as a result, such effects as cost reduction of production can be obtained. Further, the obtained aliphatic polyester film can be used in wide areas as shape holders such as blister packs used for exhibition packaging of commodities, containers such as food trays, display bottles of automatic beverage vending machines, lunch boxes and beverage cups, various industrial materials such as molded articles and surface materials for other various packaging.

What is claimed is:

1. A method of producing an aliphatic polyester film comprising:
   melt-extruding from a die an aliphatic polyester as a film;
   simultaneously 1) controlling an entrained air stream between a casting drum and the film by generating a negative pressure region and (2) inhibiting variations of film edge portion landing points on the casting drum by an electrostatic application method of applying static charges and by forming a liquid film on the casting drum only at portions corresponding to edge portions; and
   subsequently contacting the film with the casting drum over an entire width of the film.

2. The method according to claim 1, wherein the entrained air stream is controlled by at least one or more methods selected from the group consisting of a method of forming a water film on the casting drum, a method of sucking the air stream with a suction nozzle that generates a negative pressure region directly in contact with the film, installed at a position on an upstream side of a film landing site in the moving direction of a casting surface, and a method of installing a shield plate with a length not shorter than a width of the die, between a rear portion of the die and the casting drum.

3. The method according to claim 1, wherein the film contacts the casting drum over the entire width of the film by a method of using an air knife.

4. The method according to claim 1, wherein controlling the entrained air stream sucks the air stream with a suction nozzle that generates the negative pressure region directly in contact with the film, installed at a position on an upstream side of a film landing site in a moving direction of a casting surface; inhibiting the variations of film edge portion landing points comprises blowing spot air masses; and contacting film with the casting drum over the entire width of the film uses an air knife.

5. The method according to claim 1, wherein the aliphatic polyester is polylactic acid.

6. A method of producing an aliphatic polyester film comprising:

melt-extruding from a die an aliphatic polyester as a film;

simultaneously 1) controlling an entrained air stream between a casting drum by at least one or more methods selected from the group consisting of a method of sucking the air stream with a suction nozzle that generates a negative pressure region directly in contact with the film, installed at a position on an upstream side of a film landing site in the moving direction of a casting surface, and a method of installing a shield plate with a length not shorter than a width of the die, between a rear portion of the die and the casting drum and the film and (2) inhibiting variations of film edge portion landing points on the casting drum by at least one of a method of blowing spot air masses or an electrostatic application method of applying static charges and by forming a liquid film on the casting drum at only portions corresponding to edge portions; and subsequently contacting the film with the casting drum over an entire width of the film.

7. A method of producing an aliphatic polyester film comprising:

melt-extruding from a die an aliphatic polyester as a film;

simultaneously 1) controlling an entrained air stream between a casting drum by at least one or more methods selected from the group consisting of a method of sucking the air stream with a suction nozzle that generates a negative pressure region directly in contact with the film, installed at a position on an upstream side of a film landing site in the moving direction of a casting surface, and a method of installing a shield plate with a length not shorter than a width of the die, between a rear portion of the die and the casting drum and the film and (2) inhibiting variations of film edge portion landing points on the casting drum by an electrostatic application method of applying static charges and by forming a liquid film on the casting drum at only portions corresponding to edge portions; and subsequently contacting the film with the casting drum over an entire width of the film by either a method of using an air knife or an electrostatic application method of applying static changes.

* * * * *